United States Patent
Choi et al.

(10) Patent No.: US 10,261,591 B2
(45) Date of Patent: Apr. 16, 2019

(54) ELECTRONIC DEVICE AND METHOD OF CONTROLLING THE SAME

(71) Applicant: LG ELECTRONICS INC., Seoul (KR)

(72) Inventors: Hyeonchang Choi, Seoul (KR); Jaesuk Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 467 days.

(21) Appl. No.: 14/784,991

(22) PCT Filed: Aug. 11, 2014

(86) PCT No.: PCT/KR2014/007431
§ 371 (c)(1),
(2) Date: Oct. 16, 2015

(87) PCT Pub. No.: WO2015/088123
PCT Pub. Date: Jun. 18, 2015

(65) Prior Publication Data
US 2016/0370864 A1    Dec. 22, 2016

(30) Foreign Application Priority Data

Dec. 13, 2013 (KR) .......................... 10-2013-0155286

(51) Int. Cl.
*G06F 3/0488* (2013.01)
*G06F 3/01* (2006.01)
(Continued)

(52) U.S. Cl.
CPC ............ *G06F 3/017* (2013.01); *G06F 3/0481* (2013.01); *G06F 3/0486* (2013.01);
(Continued)

(58) Field of Classification Search
CPC ............................. G06F 3/017; G06F 3/0488
See application file for complete search history.

(56) References Cited

U.S. PATENT DOCUMENTS

| | | | | |
|---|---|---|---|---|
| 5,805,163 A | * | 9/1998 | Bagnas | G06F 3/0481 715/768 |
| 7,752,566 B1 | * | 7/2010 | Nelson | G06F 3/0412 715/768 |

(Continued)

FOREIGN PATENT DOCUMENTS

| | | |
|---|---|---|
| CN | 103455236 | 12/2013 |
| EP | 2 631 812 A1 | 8/2013 |

(Continued)

OTHER PUBLICATIONS

International Search Report and Written Opinion issued in Application No. PCT/KR2014/007431 dated Nov. 18, 2014.

(Continued)

*Primary Examiner* — Andrea C Leggett
(74) *Attorney, Agent, or Firm* — Ked & Associates, LLP

(57) ABSTRACT

The present invention relates to an electronic device and a method of controlling the same. The present invention provides an electronic device and a method of controlling the same to efficiently perform multitasking through multiple windows by displaying a floating window having predetermined transparency such that the floating window overlaps with at least part of the multiple windows while the multiple windows are displayed.

20 Claims, 15 Drawing Sheets

(51) Int. Cl.
*G06F 3/0481* (2013.01)
*G06F 3/0484* (2013.01)
*G06F 3/0486* (2013.01)

(52) U.S. Cl.
CPC ........ *G06F 3/0488* (2013.01); *G06F 3/04847* (2013.01); *G06F 2203/04803* (2013.01); *G06F 2203/04804* (2013.01)

(56) References Cited

U.S. PATENT DOCUMENTS

| | | | |
|---|---|---|---|
| 8,345,017 | B1 | 1/2013 | Cho |
| 2006/0061597 | A1* | 3/2006 | Hui ................ G06F 3/0481 345/629 |
| 2010/0041442 | A1 | 2/2010 | Hong |
| 2010/0056220 | A1* | 3/2010 | Oh ................ G06F 1/1616 455/566 |
| 2011/0083099 | A1 | 4/2011 | Eun |
| 2011/0179386 | A1 | 7/2011 | Shaffer |
| 2013/0222283 | A1 | 8/2013 | Yun |
| 2013/0222296 | A1 | 8/2013 | Paek |
| 2013/0254714 | A1 | 9/2013 | Shin et al. |
| 2013/0300684 | A1 | 11/2013 | Kim et al. |
| 2015/0067573 | A1* | 3/2015 | Seo ................ G06F 3/04886 715/773 |

FOREIGN PATENT DOCUMENTS

| | | |
|---|---|---|
| EP | 2 669 784 | 12/2013 |
| WO | WO 2009/143075 | 11/2009 |
| WO | WO 2013/151354 | 10/2013 |

OTHER PUBLICATIONS

European Search Report dated May 11, 2017 issued in Application No. 14868740.3.
European Search Report dated Jan. 23, 2018 issued in Application No. 14868740.3.
Chinese Office Action dated Oct. 20, 2017 issued in Application No. 201480010299.7 (English translation attached).
Chinese Office Action dated Aug. 16, 2018 issued in Application No. 201480010299.7 (English translation attached).

* cited by examiner

[Fig. 1]
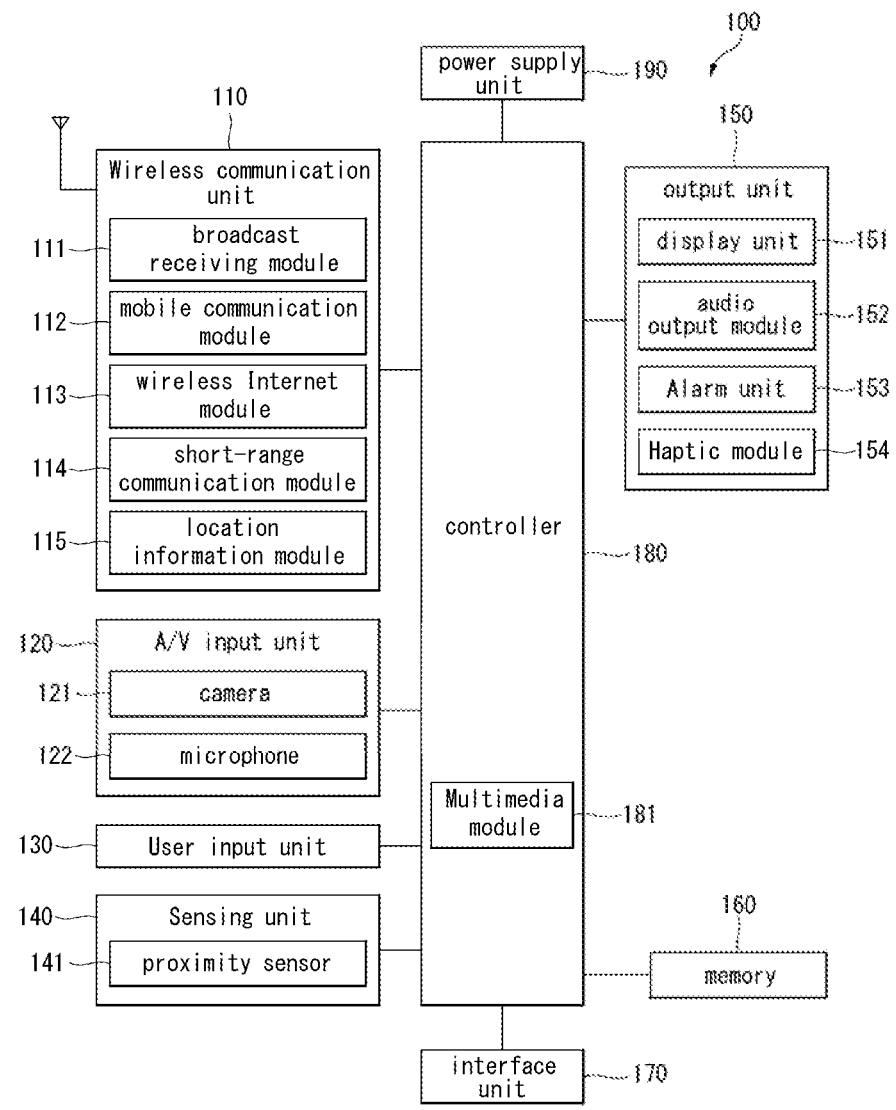
[Fig. 2]
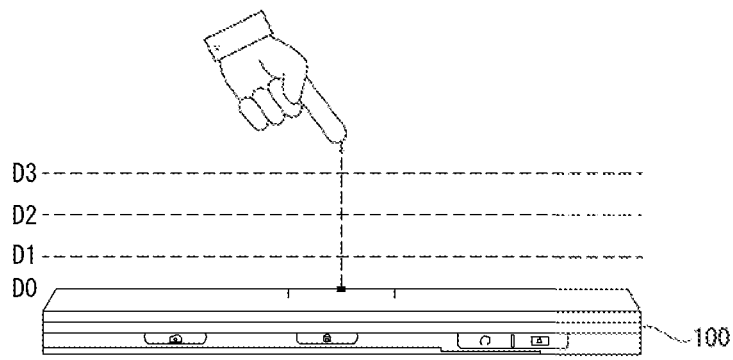

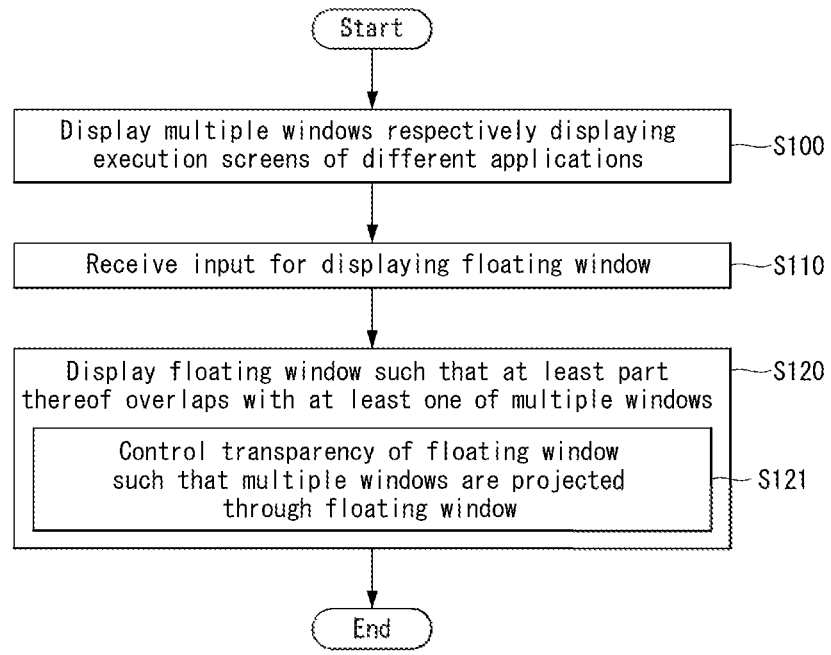
[Fig. 3]
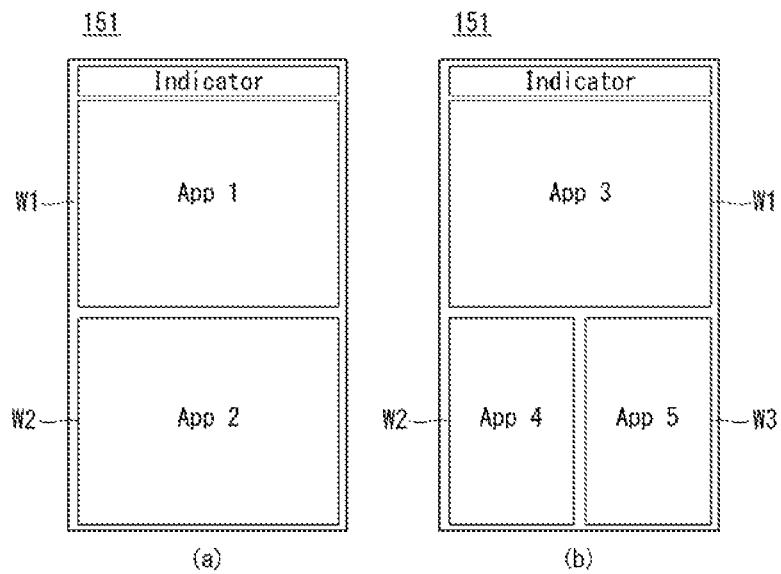
[Fig. 4]

[Fig. 5]
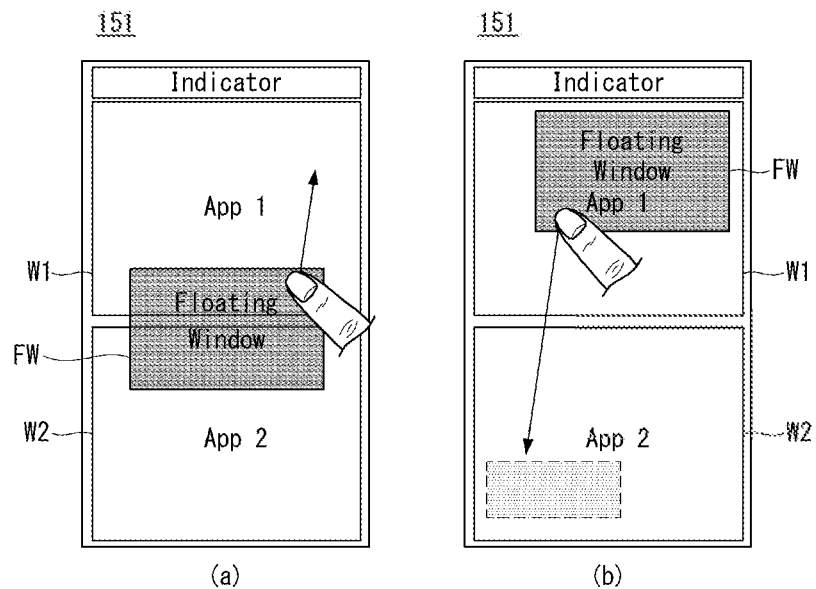
[Fig. 6]
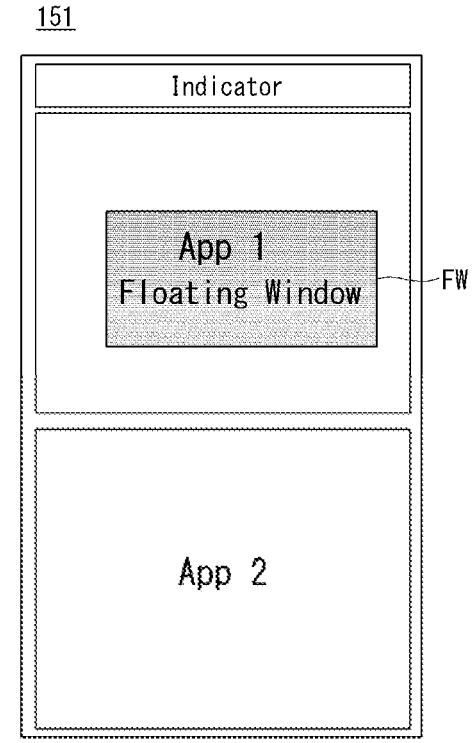

[Fig. 7]
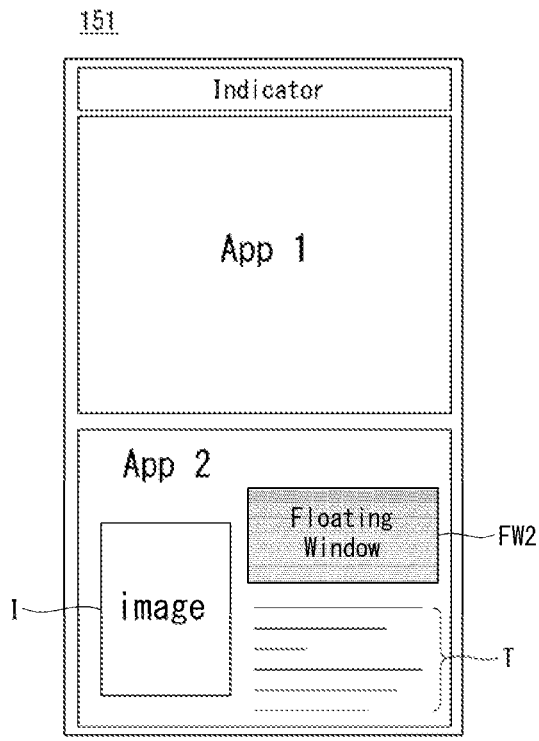
[Fig. 8]
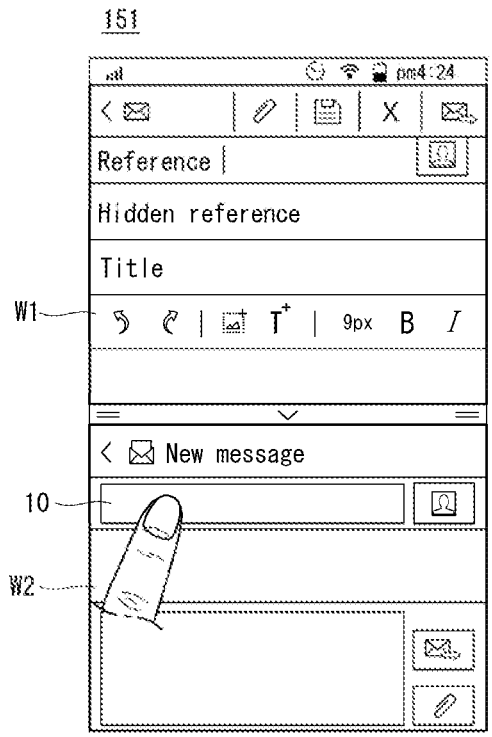

[Fig. 9]
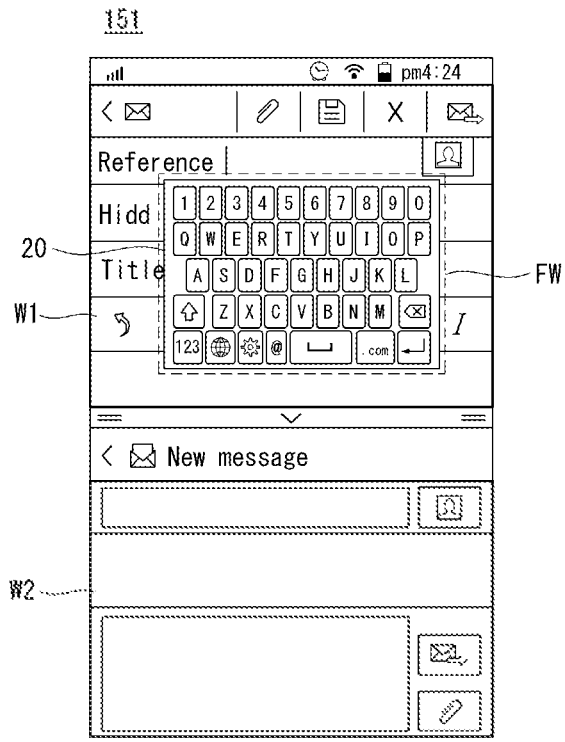
[Fig. 10]
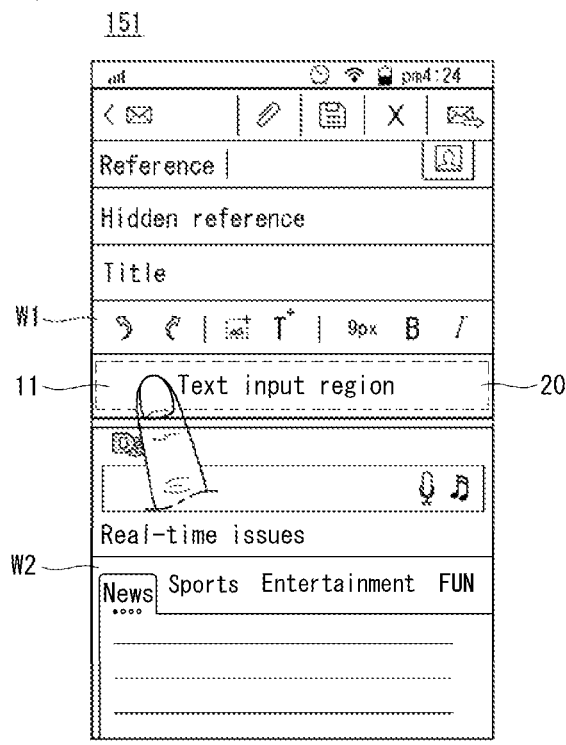

[Fig. 11]
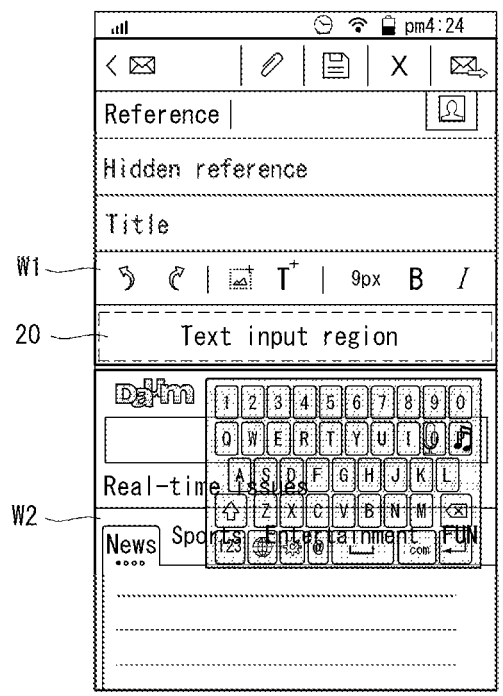
[Fig. 12]
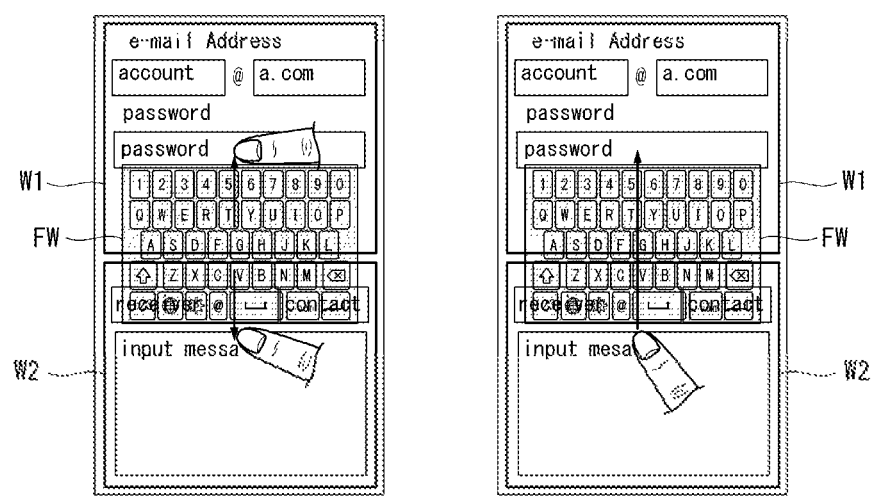

[Fig. 13]
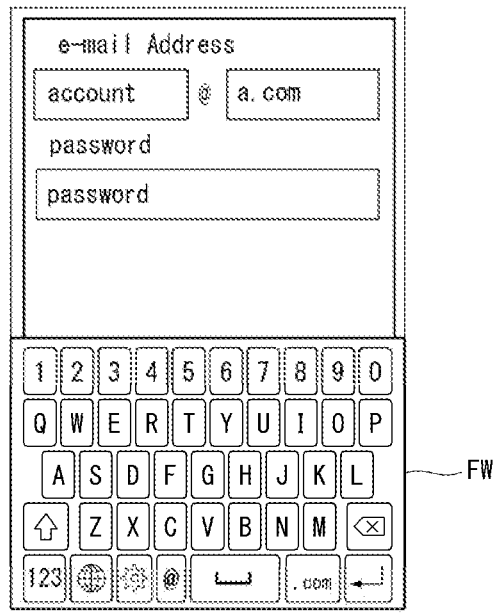
[Fig. 14]
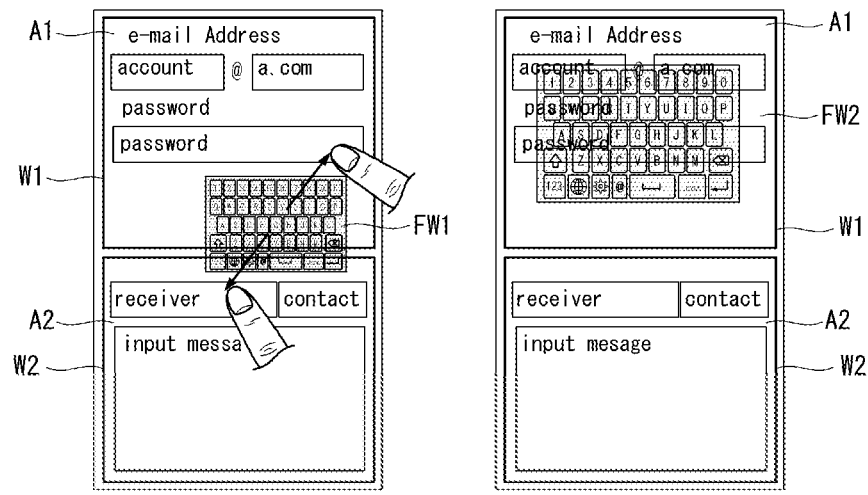

[Fig. 15]
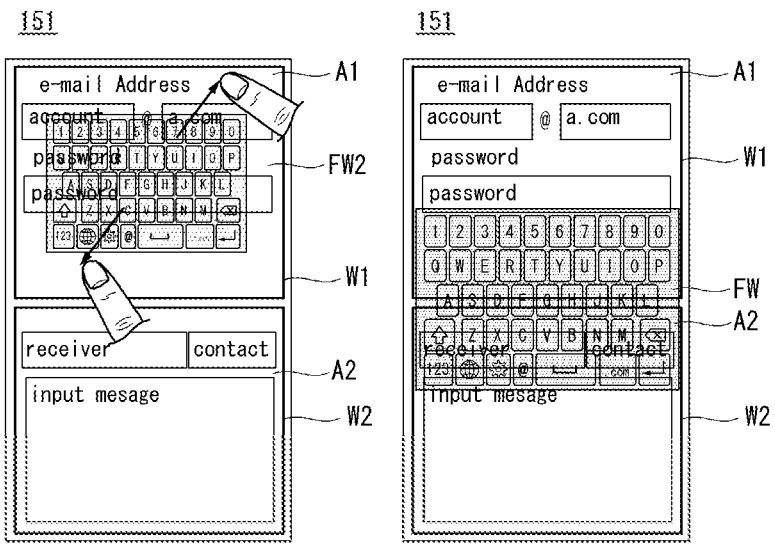
[Fig. 16]
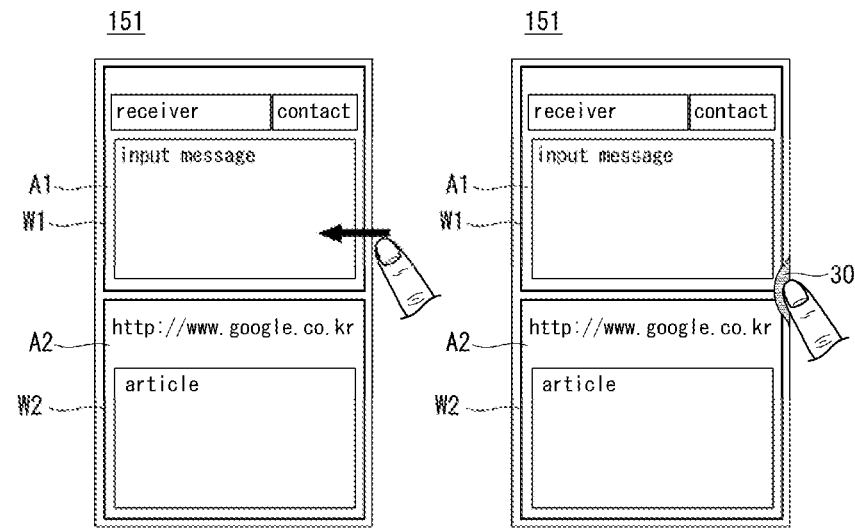

[Fig. 17]
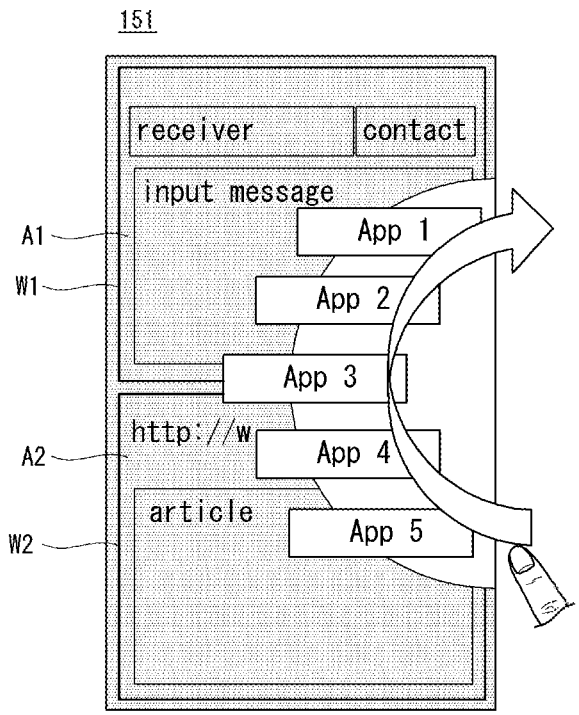
[Fig. 18]
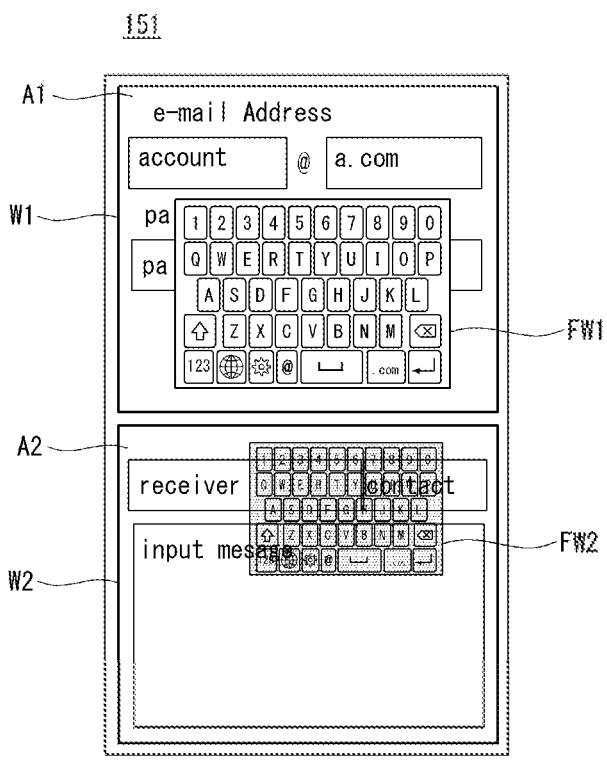

[Fig. 19]
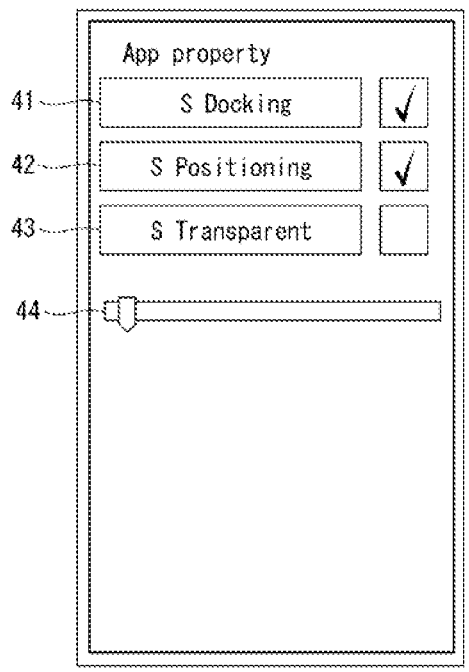
[Fig. 20]
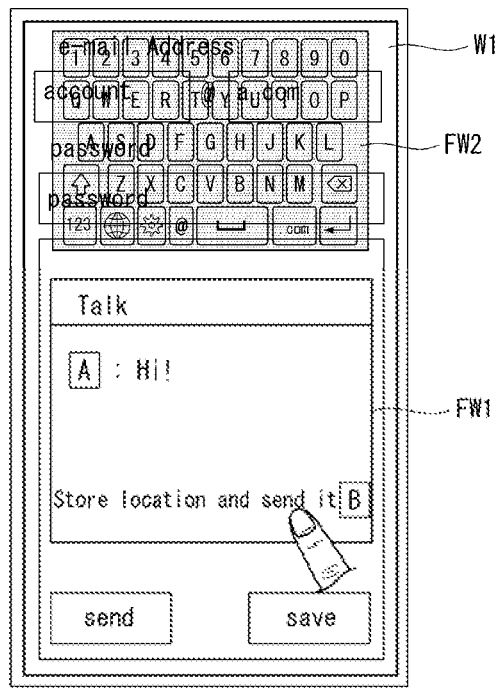

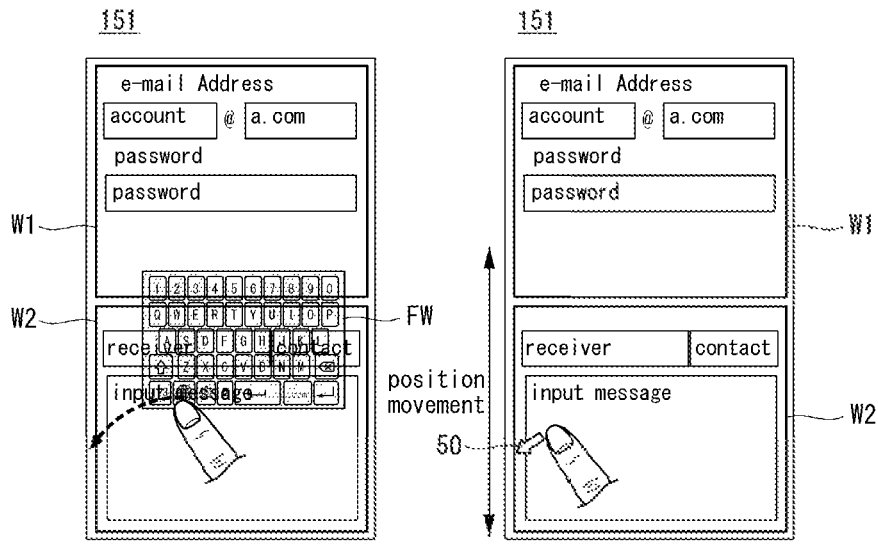
[Fig. 21]
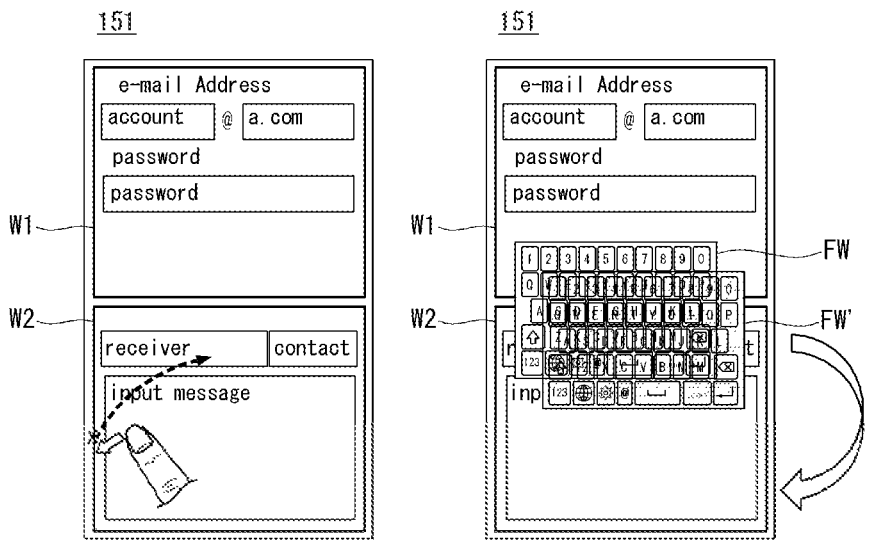
[Fig. 22]

[Fig. 23]
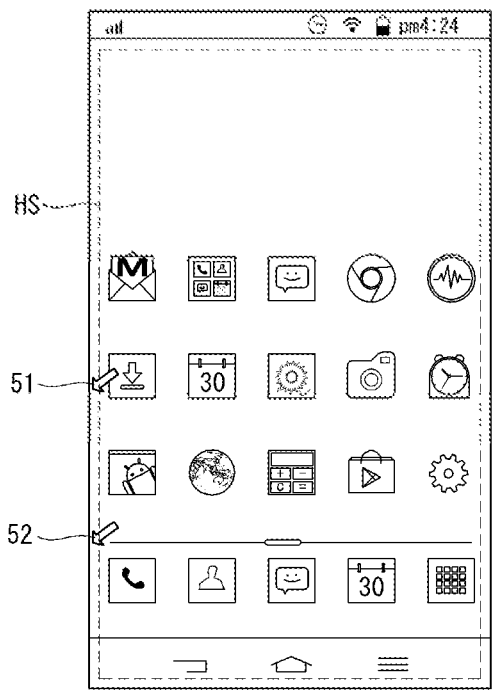
[Fig. 24]
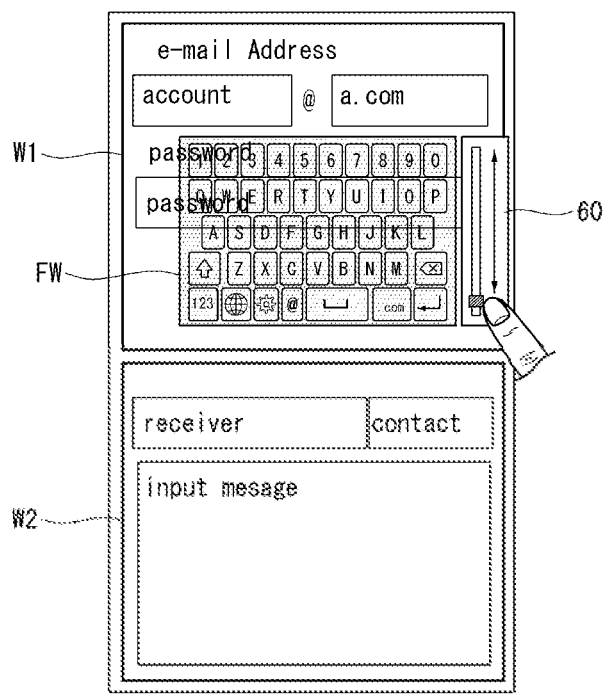

[Fig. 25]
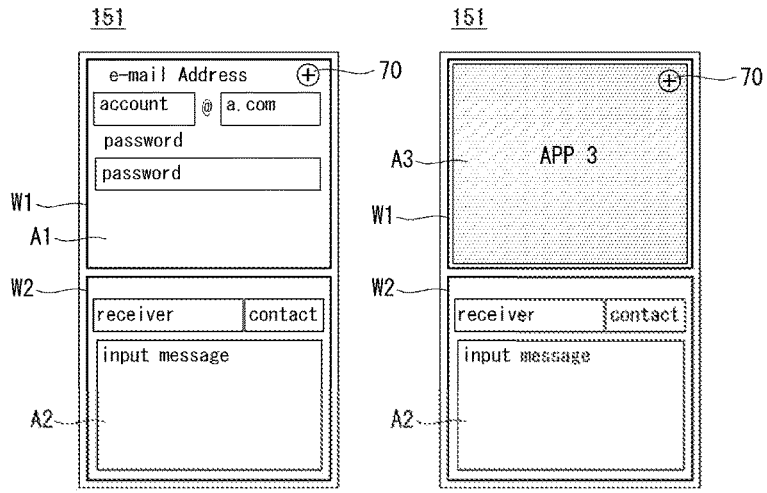
[Fig. 26]
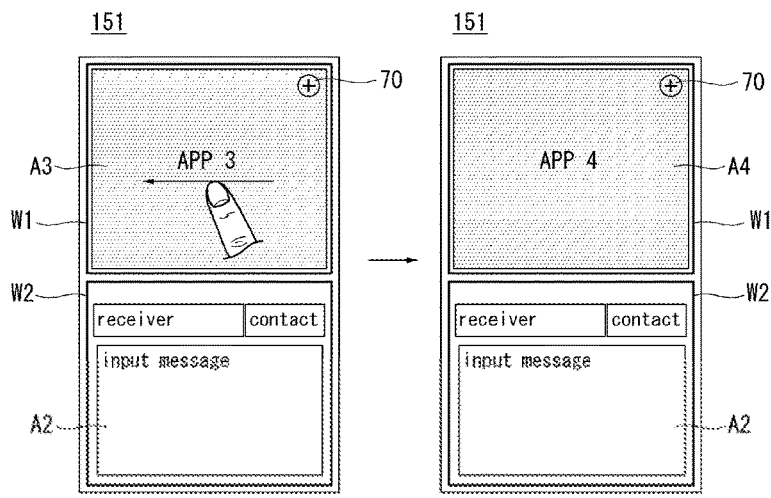
[Fig. 27]
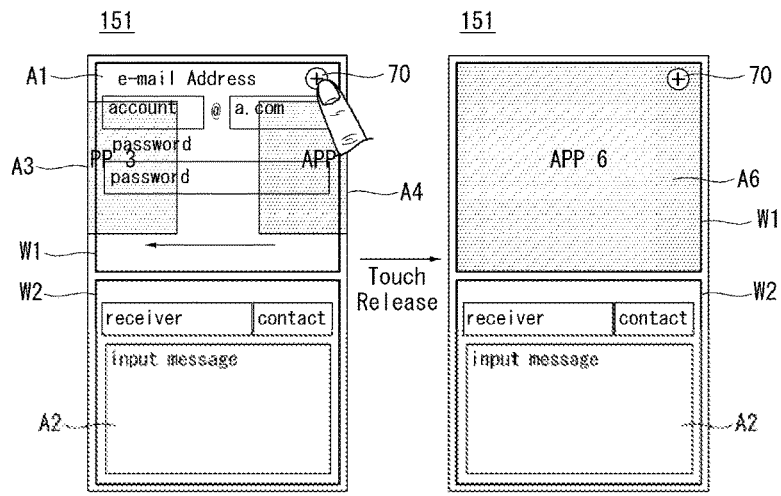

[Fig. 28]
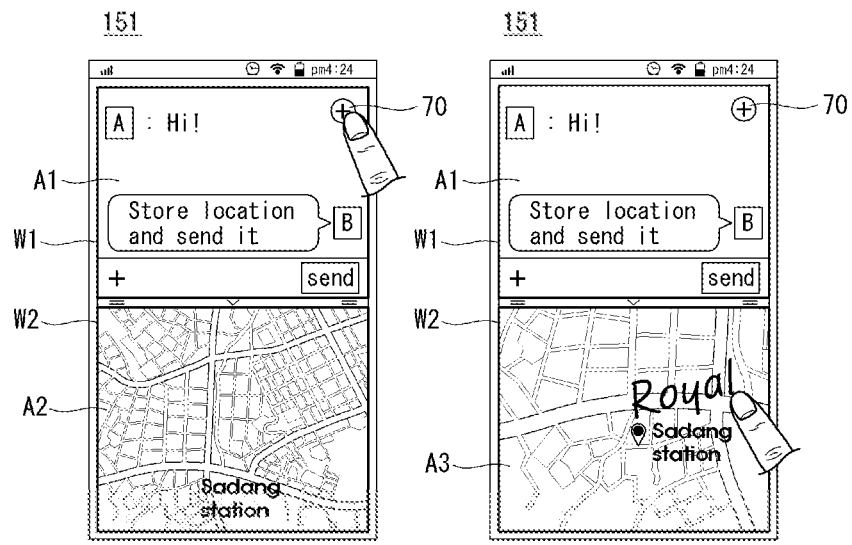
[Fig. 29]
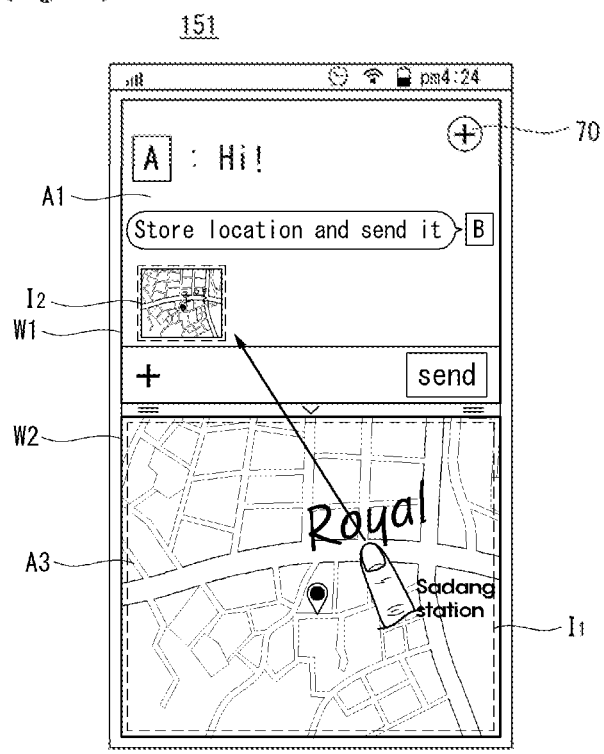

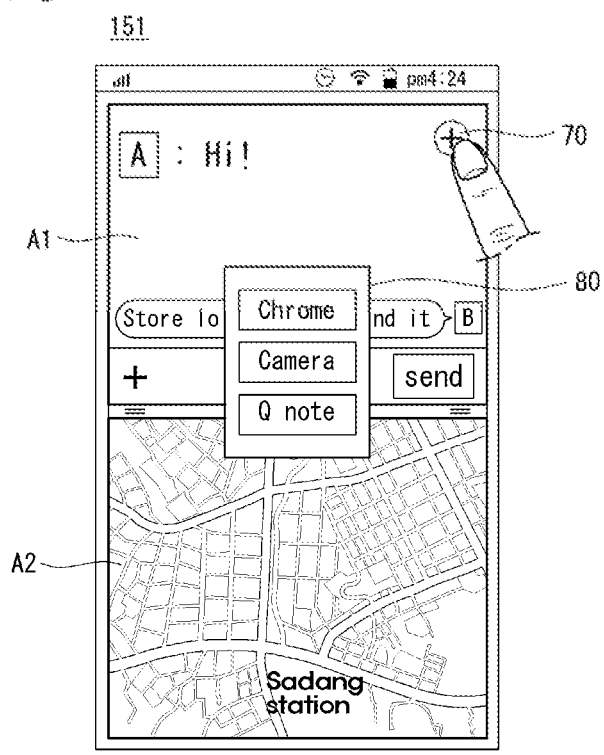
[Fig. 30]

ELECTRONIC DEVICE AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2014/007431, filed Aug. 11, 2014, which claims priority to Korean Patent Application No. 10-2013-0155286, filed Dec. 13, 2013, whose entire disclosures are hereby incorporated by reference.

TECHNICAL FIELD

The present invention relates to an electronic device and a method of controlling the same.

BACKGROUND ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural, part and/or a software part of the terminal would be desirable.

Furthermore, various methods for controlling mobile terminals based, on the user's eye gesture are under development.

DISCLOSURE OF INVENTION

Solution to Problem

An object of the present invention is to provide an electronic device providing a user interface through which a user can control the electronic device easily and efficiently and a method of controlling the same.

Another object of the present invention is to provide an electronic device providing a user interface through which more efficient multitasking can be performed using multiple windows and a method of controlling the same.

Yet another object of the present invention, is to provide an electronic device capable of efficiently performing multitasking through multiple windows by controlling transparency of a floating window and a method of controlling the same.

Still another object of the present invention is to provide an electronic device capable of efficiently performing multitasking through multiple windows by controlling the location, size and transparency of a floating window and a method of controlling the same.

The technical problems solved by the present invention are not limited to the above technical problems and those skilled in the art may understand other technical problems from the following description.

Advantageous Effects of Invention

The electronic device and method of controlling the same according to the present invention have the following advantages.

According to an embodiment of the present, invention, it is possible to provide a user interface through which a user can control, the electronic device easily and efficiently.

According to an embodiment of the present invention, it is possible to provide a user interface through which more efficient multitasking can be performed using multiple windows.

According to an embodiment of the present invention, it is possible to efficiently perform multitasking through multiple windows by controlling transparency of a floating window.

According to an embodiment of the present invention, it is possible to efficiently perform multitasking through multiple windows by controlling the location, size and transparency of a floating window.

BRIEF DESCRIPTION OF DRAWINGS

The accompanying drawings, which are included to provide a further understanding of the invention, illustrate embodiments of the invention and together with the description serve to explain the principle of the invention. In the drawings:

FIG. 1 is a block diagram of an electronic device according to an embodiment of the present invention;

FIG. 2 is a conceptual view illustrating proximity depth of a proximity sensor;

FIG. 3 is a flowchart illustrating a method of controlling an electronic device according to an embodiment of the present invention;

FIG. 4 illustrates display of multiple windows applied to an embodiment of the present invention;

FIG. 5 is a conceptual view illustrating a floating window applied to an embodiment of the present invention;

FIGS. 6 and 7 illustrate methods of displaying a floating window applied to an embodiment of the present invention;

FIGS. 8 and 9 illustrate an example of displaying a floating window according to an embodiment of the present invention;

FIGS. 10 and 11 illustrate an example of controlling the transparency of the floating window and displaying the same according to an embodiment of the present invention;

FIGS. 12 and 13 illustrate an example of fixing the floating window displayed along with the multiple windows;

FIGS. 14 and 15 illustrate an example of simultaneously controlling the size and transparency of the floating window according to an embodiment of the present invention;

FIGS. 16, 17 and 18 illustrate an example of displaying a multi-tasking application as a floating window according to an embodiment of the present invention;

FIG. 19 illustrates an example of a screen for setting display attributes of the floating window applied to an embodiment of the present invention;

FIG. 20 illustrates an example of displaying a plurality of floating windows according to an embodiment of the present invention;

FIGS. 21, 22 and 23 illustrate an example of reducing and biding a floating window and an example of re-displaying the hidden floating window according to an embodiment of the present invention;

FIG. 24 illustrates an example of controlling the transparency of the floating window according to an embodiment of the present invention;

FIGS. 25, 26 and 27 illustrate an example of displaying an application executed in the background through the multiple windows according to an embodiment of the present invention;

FIGS. 28 and 29 Illustrate an example of displaying an application related to an application executed through the multiple windows through the floating window according to an embodiment of the present invention; and FIG. 30 illustrates a pop-up window through which an application that can be provided through, the floating window can be selected according to an embodiment of the present invention.

MODE FOR THE INVENTION

The present invention will now be described more fully with reference to the accompanying drawings, in which exemplary embodiments of the invention are shown. The invention may, however, be embodied in many different forms and should not be construed as being, limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

FIG. 1 is a block diagram of a mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc, FIG. 1 shows the mobile terminal as having various components, but implementing all of the illustrated components is not a requirement. Greater or fewer components may alternatively be implemented.

In addition, the wireless communication unit 110 generally includes one or more components allowing radio communication between the mobile terminal 100 and a wireless communication system or a network in which the mobile terminal is located. For example, in FIG. 1, the wireless communication unit includes at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast, management server via a broadcast channel Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include, a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld. (DVB-H) system, and the like.

The broadcast receiving module 111 may also be configured to receive signals broadcast by using various types of broadcast systems. In particular, the broadcast receiving module 111 can receive a digital broadcast using a digital broadcast system such us the multimedia broadcasting-terrestrial (DMB-T) system, the digital multimedia broadcasting-satellite (DMB-S) system, the digital video broadcast-handheld (DVB-H) system, the data broadcasting system known as the media forward link only (Media-FLO®), the integrated services digital broadcast-terrestrial (ISDB-T) system, etc.

The broadcast receiving module 111 can also be configured to be suitable for all broadcast systems that provide a broadcast signal, as well, as the above-mentioned digital broadcast systems. In addition, the broadcast signals and/or broadcast-associated information received via the broadcast receiving module 111 may be stored in the memory 160.

In addition, the mobile communication module 112 transmits and/or receives radio signals to and/or from, at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN ( Wireless LAN) (Wi-Fi), Wibro (Wireless broadband), Wimax (World Interoperability for Microwave Access), BSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), Zig-Bee™, and the like.

Also, the location information module 115 is a module for checking or acquiring a location or position of the mobile terminal. The location information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLO- MASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information, according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 1, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored, in the memory 160 or transmitted via the wireless communication unit 110. Two or more cameras 121 may also be provided according to the configuration of the mobile terminal.

In addition, the microphone 122 can receive sounds via a microphone in a phone call mode, a recording mode, a voice recognition mode, and the like, and can process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

Also, the user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc, due to being contacted), a jog wheel, a jog switch, and the like.

Further, the sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device, in FIG. 1, the sensing unit 140 also includes a proximity sensor 141.

In addition, the output unit 150 is configured to provide outputs in a visual audible, and/or tactile manner. In the example in FIG. 1, the output unit 150 includes the display unit 151, an audio output module 152, an alarm unit 153, a haptic module 154, and the like. In more detail, the display unit 151 can display information processed in the mobile terminal 100. For example, when the mobile terminal 100 is in a phone call mode, the display unit 151 can display a User Interface (UI) or a Graphic User Interface (GUI) associated with a call or other communication.

The display unit 151 may also include at least one of a liquid Crystal Display (LCD), a Thin Film Transistor-LCD (TPT-LCD), an Organic Light Emitting Diode (OLED) display, a flexible display, a three-dimensional (3D) display, or the like. Some of these displays may also be configured to be transparent, or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

Further, the mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 can function as both an input, device and an output device. The touch sensor may have a form, of a touch film, a touch sheet, a touch pad, and the like.

Further, the touch sensor may be configured to convert pressure applied to a particular portion of the display unit 151 or a change in the capacitance or the like generated at a particular portion of the display unit 131 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display unit 151 has been touched.

With reference to FIG. 1, the proximity sensor 141 may be disposed within or near the touch screen, in more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement, state, or the like) can be detected, and information corresponding to the detected proximity touch operation, and the proximity touch pattern can be output to the touch screen.

Further, the audio output module 152 can convert and output as sound audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack.

In addition, the alarm unit 153 can output information about the occurrence of an event of the mobile terminal 100. Typical events include call reception, message reception, key signal inputs, a touch input etc. In addition to audio or video outputs, the alarm unit 153 can provide outputs in a different manner to inform about the occurrence of an event. For example, the alarm unit 153 can provide an output in the form of vibrations. The video signal or the audio signal may be also output through the display unit 151 or the audio output module 152.

In addition, the haptic module 154 generates various tactile effects the user may feel One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also he implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Further, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card, micro type, a card-type memory (e.g., SD or DX. memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Also, the interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected, with an external cradle, the interface unit 170 can also serve as a passage to allow power from the cradle to be supplied therethrough to the mobile terminal 100 or serve as a passage to allow various command, signals input by the user from the cradle to be transferred, to the mobile terminal therethrough. Various command signals or power input from the cradle may operate as signals for recognizing that the mobile terminal is properly mounted on the cradle.

In addition, the controller 180 controls the general operations of the mobile terminal. For example, the controller 180 performs controlling and processing associated with voice calls, data communications, video calls, and the like. In the example in FIG. 1, the controller 180 also includes a multimedia module 181 for reproducing multimedia data. The multimedia module 181. may be configured within the controller ISO or may be configured to be separated from the controller 180. The controller 180 can also perform a pattern recognition processing to recognize a handwriting input or a picture drawing input performed on the touch screen as characters or images, respectively.

Also, the power supply unit 190 receives external power or internal power and supplies appropriate power required for operating respective elements and components under the control of the controller 180. Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modifies. Each software module may perform one or more functions or operations described herein. Software codes can be implemented by a software application written in any suitable programming language. The software codes may be stored in the memory 160 and executed by the controller 180.

Next, FIG. 2 is a conceptual view illustrating a proximity depth of the proximity sensor 141. As shown in FIG. 3, when a pointer such as the user's finger, a pen, or the like, approaches the touch screen, the proximity sensor 141 disposed within or near the touch screen detects it and outputs a proximity signal. The proximity sensor 141 may also be configured to output a different proximity signal according to the distance (referred to as a 'proximity depth', hereinafter) between the closely touched pointer and the touch screen.

FIG. 2 also shows the section of the touch screen with the proximity sensor 141 for detecting, for example, three proximity depths. The proximity sensor 141 may detect three or less or four or more proximity depths. In more detail, when the pointer is fully brought into contact with the touch screen d0, this position is recognized as a contact touch. When the pointer is positioned to be spaced apart by shorter than a distance d1 on the touch screen, this position is recognized as a proximity touch with a first proximity depth.

If the pointer is positioned to be spaced apart by the distance longer than the distance d1 but shorter than a distance d2 on the touch screen, this position is recognized as a proximity touch with a second proximity depth. Also, if the pointer is positioned to be spaced apart by the distance longer than the distance d2 but shorter than a distance d3, this position is recognized as a proximity touch with a third proximity depth. If the pointer is positioned to be spaced apart by longer than the distance d3 on the touch screen, this position is recognized that the proximity touch has been released.

Accordingly, the controller 180 can recognize the proximity touches as various input signals according to the proximity depths and proximity positions of the pointer, and control various operations according to the various input signals.

FIG. 3 is a flowchart illustrating a method of controlling an electronic device according to an embodiment of the present invention.

The method of controlling an electronic device according to an embodiment of the present invention, may be implemented in the electronic device 100 described with reference to FIGS. 1 and 2. The method of controlling the electronic device 100 according to an embodiment of the present invention and operations of the electronic device 100 to implement, the method will now be described in detail with reference to the attached drawings.

Referring to FIG. 3, the controller 180 may display multiple windows which respectively display execution screens of different applications on the touchscreen 151 (S100).

When a predetermined application is executed through the electronic device 100, an application execution screen may be displayed on the touchscreen 151 through a window having a predetermined size. The predetermined size may refer to the size of the touchscreen 151. Accordingly, the execution screen of the predetermined application may be provided through a window corresponding to the size of the touchscreen 151.

In an embodiment of the present invention, multiple windows are provided. The multiple windows may be provided in a structure in which at least two windows are arranged on the touchscreen 151. For example, when the multiple windows include two windows, the two windows are displayed on the touchscreen 151 and predetermined applications are respectively executed through the windows. That is, when two applications are multitasked, execution screens of the multitasked applications are displayed through the respective windows on one screen.

Multitasking of the two applications may include a case in which the second application is executed through the second window during execution of the first application through the first window while the first window is closed without ending the first application.

FIG. 4 illustrates display of multiple windows applied to an embodiment of the present invention.

Referring to FIG. 4(a), when the first application APP1 is executed through the first window W1 and the second application APP2 is executed through the second window, the first, window W1 and the second window W2 may be displayed on the upper and lower parts of the touchscreen 151.

When three applications are executed, execution screens of the applications may be displayed on three different windows. For example, as shown in FIG. 4(b), execution screens of third, fourth and fifth applications APP3, APP4 and APP5 may be respectively displayed through the first, second and third windows W1, W2 and W3. Arrangement of the first, second and third windows W1, W2 and W3 is not limited to the example shown in FIG. 4(b) and may be changed, To display N applications through N windows on the touchscreen 151, at least portions of at least two windows may be displayed in an overlapping manner.

The method of controlling an electronic device according to an embodiment of the present invention is not limited to an example of controlling display of a floating window with multiple windows and is applicable to a case in which, the floating window is displayed while one application is executed through one window.

The following description is given on the assumption that, multiple windows are displayed on the touchscreen 151 for convenience.

Referring back to FIG. 3, the controller 180 may receive an input for displaying a floating window (S110).

The controller 180 may display fee floating window, which is discriminated from the multiple windows through a predetermined input while the multiple windows are displayed on the touchscreen 151, on the touchscreen 151.

The floating window may differ from the multiple windows in terms of size, movement, split availability and transparency.

FIG. 5 is a conceptual view illustrating the floating window applied to an embodiment of the present invention.

Referring to FIG. 5(a), the execution screen of the first application APP1 may be displayed through the first window W1 and the execution screen, of the second application APP2 may be displayed through the second window W2. In addition, the floating window FW may be displayed in such a manner that at least part of the floating window FW overlaps with at least one of the first and second windows W1 and W2.

The first window W1 and the second window W2 may have sizes that make the two windows occupy the entire area of the touchscreen 151 when the windows are arranged on upper and lower parts of the touchscreen 151. However, the floating window FW may be displayed in a size corresponding to or less than, the first window W1 or the second window W2.

The floating window FW may be moved through the entire area of the touchscreen 151 while the multiple windows W1 and W2 are displayed on the touchscreen 151. That is, the floating window FW may be moved in the entire area of the touchscreen 151 through touch input (drag input) of a user while the multiple windows W1 and W2 are fixed.

In addition, the floating window FW may have predetermined transparency such that a background can be projected through the floating window FW. The transparency may be changed in the range of 0% to 100%. Furthermore, the transparency may be adaptively changed according to projected background.

The size and transparency of the floating window FW may be adaptively changed according to the type of an application displayed on a window to which the floating window FW is moved. For example, as shown in FIG. 5(b), upon, reception, of drag input for moving the floating window FW displayed on the first window W1 to the second window W2, the controller 180 can reduce the size of the floating window FW and increase the transparency thereof such that the floating window FW overlaps with the execution screen of the second application APP2 displayed on the second window W2.

FIG. 6 illustrates a method of displaying the floating window FW applied to an embodiment of the present invention.

Referring to FIG. 6, the floating window FW may be displayed overlapping with the first window W1 and having transparency controlled to project the execution screen of the first application APP1. That is, the transparency of the floating window FW may be 0% or more.

Referring to FIG. 7, when the floating window FW is located, in the second window W2, the size and transparency of the floating window FW may be simultaneously changed and displayed on the second window W2. When content displayed on the second window W2 includes an image I and text T, the floating window FW may be displayed at a position in the second window W2, at which the floating window FW does not overlap with the image I and text T. The controller 180 may adjust the transparency of the floating window FW to 0% when the floating window FW does not overlap with the image I and text T.

A description will be given of an embodiment in which a keypad is displayed through the floating window when at least one of applications displayed through the multiple windows W1 and W2 includes an application, having an input field for text input.

FIGS. 8 and 9 illustrate an example of displaying a floating window according to an embodiment of the present invention.

Referring to FIG. 8, the controller 180 displays the first, window W1 by executing an e-mail application through predetermined user input and displays the second window W2 by executing a text message application through predetermined user input. Here, it is assumed that the first window W1 and the second, window W2 are arranged on the upper and lower parts of the touchscreen 151, as described above, and thus execution screens of the two different applications are displayed as one touchscreen image.

Multiple windows may be displayed in various manners. For example, when the controller 180 sequentially executes the e-mail, application and the text message application in a multi-window mode, the execution screens of the two applications can be displayed on the upper and lower parts of the touchscreen 151. However, the present invention is not limited thereto and the multiple windows can be displayed on the touchscreen 151 through various methods.

Upon reception of touch input applied to a text input field displayed on the second window W2, the controller 180 may display a keypad 20 as a floating window FW, as shown in FIG. 9. Here, the floating window FW may be displayed in the first window W1 since a user attempts to input text through the second window W2, When the user applies touch input to the test input field, the controller 180 may recognize that the user attempts to input, a text message through the text input field. Accordingly, it is possible to display the necessary floating window FW at an optimal position by recognizing the position of touch input of the user while the multiple windows W1 and W2 are displayed, according to an embodiment of the present invention.

Referring to FIG. 9, the controller 180 may move the floating window FW displayed in the first window W1 to the second window W2 upon reception of touch input applied to an e-mail, input field displayed on the first window W1.

When the controller 180 receives touch input applied to the e-mail input filed displayed on the first window W1, the controller 180 may increase a transparency value of the floating window FW such that an e-mail application execution screen is projected through the floating window FW. Accordingly, the user may input text using the keypad, having predetermined transparency while watching the e-mail application execution screen.

FIGS. 10 and 11 illustrate an example of controlling the transparency of a floating window and displaying the floating window according to an embodiment of the present invention.

Referring to FIG. 10, the controller 180 may display the multiple windows W1 and W2 on the touchscreen 151. The first window W1 corresponds to an e-mail input screen and the second window W2 displays a webpage upon execution of a web browser. Accordingly, the first window W1 has at least one input field for inputting text.

Upon reception of touch input of the user, which is applied to the input field (e.g. region in which e-mail test is written) displayed in the first window W1, the controller 180 may display the keypad in the form of a floating window F2 on the second window W2. In addition, the controller 180 may control the transparency of the floating window FW to project the execution screen of the application being executed through the second window W2 through the keypad.

Accordingly, the user may create e-mail through the first window W1 using the keypad of the floating window FW while viewing the webpage displayed on the second window W2. That is, the user may display a webpage and create e-mail through one screen at the same time in a mobile terminal environment.

In the case of an electronic device having a large-size display, execution screens of a plurality of multi-tasked applications can be displayed on one touchscreen through a plurality of windows. According to the present invention, it is possible to efficiently execute a plurality of functions implemented through the plurality of windows through at least one floating window.

FIGS. 12 and 13 illustrate an example of fixing the floating window displayed along with the multiple windows.

In the case of applications (e.g. messenger application, notepad, application, etc.) having a text input field, the keypad may be automatically displayed on the touchscreen upon reception of touch input applied to the text input field. For example, when the messenger application is executed, a first area of the touchscreen 151 may be a keypad area and a second area thereof may be an area for displaying text input through the keypad.

According to an embodiment of the present invention, the first area corresponding to the keypad is separated from the messenger application execution screen and provided as a floating window.

The keypad separated from the messenger application execution screen and provided as a floating window may be inserted into the messenger application execution screen.

Referring to FIG. 12, when zoom-in input or predetermined input is applied to the floating window FW while the multiple windows W1 and W2 and the floating window FW are simultaneously displayed on the touchscreen 151, the first area corresponding to the keypad may be displayed with, the second area displaying input, text on one window W1.

That is, it is possible to fix the position of the keypad to a point on the touchscreen 151 by displaying the keypad provided in the form of a floating window FW on a fixed window.

Therefore, the method of controlling the electronic device according to an embodiment of the present invention can separate one of the first and second areas through which different functions are respectively executed from the application execution screen divided into the first and second areas and provide the separated area in the form of a floating window.

While the first area and the second area respectively correspond to an area for inputting text and an area for displaying text input through the text input area in the aforementioned example, the present invention is not limited thereto and may be modified in various manners.

FIGS. 14 and 15 illustrate an example of simultaneously controlling the size and transparency of the floating window according to an embodiment of the present invention.

The method for controlling the electronic device according to an embodiment of the present invention may control, display characteristics of the floating window FW when displaying the floating window FW with the multiple windows W1 and W2.

Referring to FIG. 14, if an e-mail execution screen A1 is displayed through the first window W1 and a text message execution screen A2 is displayed through the second window W2, then a floating window FW1 corresponding to the keypad and the multi-window W1 and W2 are simultaneously displayed, through predetermined touch input The floating window FW1 may be displayed overlapping with at least part of the first window W1 and/or the second window W2 while having a first size and first transparency.

Upon reception of zoom-in input applied to the floating window FW1, the controller 180 may change the size of the floating window FW1 to correspond to die size of the first window W1 and display the floating window FW2 such that the floating window FW2 and the first window W1 overlap. In addition, the controller 180 may increase the transparency of the floating window FW2 such that the first window W1 is projected through the floating window FW1.

Referring to FIG. 15, upon reception of zoom-in input applied to the floating window FW2 overlapping with the first window W1, the controller 180 may adjust the size of the floating window FW2 such that the floating window FW covers both the first window W1 and the second window W2 and, simultaneously, further increase the transparency of the floating window FW such that both the first application execution screen A1 and the second application execution screen A2 are projected through the floating window FW.

While the keypad is displayed through the floating window in the aforementioned embodiments, the present invention is not limited thereto and one of a plurality of multi-tasked applications may be provided in the form of a floating window FW.

FIGS. 16, 17 and 18 illustrate an example of displaying a multi-tasked application as a floating window according to an embodiment of the present invention.

Referring to FIGS. 16 and 17, when a first application A1 from among currently executed applications is displayed through the first window W1 and a second application A2 is displayed through the second window W2, the controller 180 may display a bar 30 for controlling display of at least one application, which is not currently displayed on the touchscreen 151 but is executed according to multi-tasking, on the touchscreen 151 upon reception of a predetermined input.

For example, the controller 180 may display the bar 30 at one side of the touchscreen 151 upon reception of slide input starting from one side of the touchscreen 151. when the multiple windows W1 and W2 are displayed on the touchscreen 151.

When touch input is applied to the bar 30, the controller 180 may display, on the touchscreen 151, one or more applications APP3, APP4, APP5, APP6 and APP7 executed in the background or having execution windows closed except for first and second applications APP1 and APP2 displayed through the multiple windows W1 and W2, as shown in FIG. 17.

Upon selection of one of the applications APP3, APP4, APP5, APP6 and APP7, the controller 180 may display the selected application through the floating window FW on the touchscreen 151 along with the multiple windows W1 and W2.

The controller 180 may display an application selected from the applications APP3, APP4, APP5, APP6 and APP7 through a first floating window FW1, such that the selected application and the first window W1 overlap.

The controller 180 may display an application selected from the applications APP3, APP4, APP5, APP6 and APP7 through a second floating window FW2 such that the selected application and the second window W2 overlap by increasing the transparency of the floating window FW2 and adjusting the size thereof.

FIG. 19 illustrates an example of a screen for setting display attributes of the floating window applied to an embodiment of the present invention.

Referring to FIG. 19, the screen for setting the display attributes of the floating window may provide functions of setting docking, positioning, transparency, etc. of the floating window.

When the floating window docking function is set to ON, an application executed according to multitasking may be provided using a floating window through slide input, as described with reference to FIGS. 16 and 17. When the floating window docking function is set to OFF, the floating window may not be displayed.

When the floating window positioning function is set to ON, the controller 180 may locate the floating window at a position that does not disturb a function that the user attempts to execute through the multiple windows in consideration of types of applications displayed through the multiple windows, content, types, deployment of items, etc.

When the floating window transparency function is set to ON, the transparency of the floating window may be adjusted by flicking a predetermined transparency control bar 44 to the left and right.

FIG. 20 illustrates an example of displaying a plurality of floating windows according to an embodiment of the present invention.

Referring to FIG. 20, when, a second floating window FW2 (keypad) is retrieved while the first window W1 displaying the e-mail application and a first floating window FW1 (instance messenger application) are displayed on the touchscreen 151, the controller 180 may control display characteristics of the second floating window FW2.

That is, the controller 180 may control display of the second floating window FW2 in consideration of at least one of the position, size and transparency of the first floating window FW1 displayed prior to the-second floating window FW2 as well as the first window W1 and/or the second window W2.

Referring to FIG. 20, since the messenger application FW1 needs to use the keypad FW2, the controller 180 may control the second floating window (keypad) to overlap with the e-mail input field region rather than the first floating window (messenger application) with increased transparency.

The floating window corresponding to the keypad, described in the method of controlling the electronic device according to an embodiment of the present invention, may be frequently used. Accordingly, the keypad may be configured such that the keypad is provided in the form of a floating window all the time. In this case, when the keypad is not necessary, it is possible to display the keypad in a reduced size and float the keypad, in consideration of the position, size and transparency thereof as necessary.

FIGS. 21, 22 and 23 illustrate an example of reducing and hiding a floating window and an example of re-displaying the hidden floating window according to an embodiment of the present invention.

Referring to FIG. 21, upon reception of touch input for moving the floating window FW to one side of the touchscreen 151, the controller 180 may reduce the size of the floating window FW and display the floating window FW at one side of the touchscreen 151 as a predetermined indicator 50.

The indicator 50 may be moved up and down along one side of the touchscreen 151.

Referring to FIG. 22, upon reception of touch input for moving the indicator 50 positioned at the first side of the touchscreen 151 to the center thereof, the controller 180 may display the floating window FW at the center of the touchscreen 151.

As shown in FIG. 22, the controller 180 may change the transparency of the floating window FW according to an activation state of the floating window FW. For example, when the controller 180 receives touch, input applied to a region other than the first window W1 and the text input filed of the second window W2, the keypad may be unnecessary. In this case, the controller 180 may display the floating window FW' having second transparency instead of the floating window FW having first transparency.

The second transparency may be a transparency value that makes the first and second windows W1 and W2 in the background be seen more clearly than the floating window FW.

Referring to FIG. 23, a plurality of indicators corresponding to the floating window FW may be provided. The controller 180 may display a plurality of indicators 51 and 52 on the touchscreen 151 such that the indicators 51 and 52 do not overlap with a plurality of icons displayed, on a home screen HS.

FIG. 24 illustrates an example of controlling the transparency of the floating window according to an embodiment of the present invention.

Referring to FIG. 24, the user may directly control the transparency of the floating window FW while the multiple windows W1 and W2 and the floating window FW are displayed on the touchscreen 151.

For example, the controller 180 may display a bar 60 for controlling the transparency of the floating window FW within the range of the floating window FW upon reception of long touch input applied to the floating window FW. Accordingly, the user can control the transparency of the floating window FW through the bar 60 and view content displayed in the background, which is projected, through the floating window FW.

The method of controlling the electronic device according to an embodiment of the present invention may display the floating window FW on the touchscreen through various methods.

FIGS. 25, 26 and 27 illustrate an example of displaying an application executed in the background through, the multiple windows according to an embodiment of the present invention.

Referring to FIG. 25, a main window (e.g. W1) of the multiple windows W1 and W2 includes a button 70. The controller 180 may control the third application APP3 executed according to multitasking to be displayed on the first window W1 upon reception of touch input applied to the button 70.

The third application APP3 may be displayed on one of the first window W1 and the second window W2 upon reception of touch input applied to the button 70.

Here, the third application APP3 may be displayed on the first window W1 or the floating window FW overlapping with the first window W1. It is assumed that the third application APP3 is displayed through the floating window FW in the following description for convenience.

Referring to FIG. 26, when, predetermined touch input (e.g. slide input) is applied to the floating window FW displaying the third application APP3, the fourth application APP4 executed according to multitasking may be displayed on the floating window FW.

That is execution screens of all currently executed applications may be displayed through the floating window FW instead of the multiple windows W1 and W2 having fixed positions and sizes.

Referring to FIG. 27, when the touch input applied to the button 70 is maintained for a predetermined time, the controller 180 may sequentially display the third, fourth and fifth applications through the floating window FW in a slide manner.

When the touch input applied to the button 70 is released, the controller 180 may display the application (e.g. the sixth application A6 in FIG. 27), which is displayed through the floating window FW at the instant the touch input is released, through the floating window FW.

The example of displaying an application executed according to multitasking on the touchscreen 151 through the floating window FW has been described.

The method of controlling the electronic device according to an embodiment of the present invention may display an application related, to the currently displayed multiple windows W1 and W2 through one (e.g. second window W2) of the floating window FW and the multiple windows W1 and W2 upon reception of touch input applied to the button 70.

FIGS. 28 and 29 illustrate an example of displaying an application related to an application executed through the multiple windows through the floating window according to an embodiment of the present invention.

Referring to FIG. 28, the controller 180 may display the messenger application A1 on the first window W1 and display a map application A2 on the second window W2.

The controller 180 may display a notepad application A3 upon reception of touch input applied to the button 70 included in the first window W1.

The notepad application A3 may be provided through the floating window FW or the second window W2, as described above. The notepad application A3 is provided through the second window W2 in the following description for convenience.

The controller 180 may execute the notepad application A3 through the second window W2 and enter a writing input mode (or text input mode).

The controller 180 may capture a map image provided through the second window W2 and receive writing input of the user, which is applied to the map image. The received writing input may be stored along with the map image. The received writing input may be stored with the map image as a separate image file.

When input for moving the image displayed on the second window W2 to the execution screen of the messenger application executed through the first window W1 is received, the controller 180 may directly transmit the image including the writing input to a recipient of the messenger application.

FIG. 30 illustrates a pop-up window through which an application that can be provided through the floating window can be selected according to an embodiment of the present invention.

Referring to FIG. 30, upon, reception of input applied to the button 70 displayed on one of the windows W1 and W2, the controller 180 may provide a pop-up window 80 through which the user can select types of applications to be provided through the floating window FW.

The method for controlling of the mobile terminal according to embodiments of the present invention may be recorded in a computer-readable recording medium as a program to be executed in the computer and provided. Further, the method for controlling a mobile terminal according to embodiments of the present invention may be executed by software. When executed by software, the elements of the embodiments of the present invention are code segments executing a required, operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM. a RAM, a CD-ROM, a DVD, ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should, he construed broadly within its scope as defined in the appended claims, and therefore all changes and modifications that fail within the metes and bounds of the claims, or equivalents of such metes and bounds are therefore intended to be embraced by the appended claims.

SEQUENCE LISTING FREE TEXT

100: electronic device 151: touch screen
The invention claimed is:
1. An electronic device, comprising:
a touchscreen; and
a controller configured to:
    display multiple windows adjacent to each other, respectively displaying execution screens of different applications on the touchscreen, wherein the respective multiple windows have sizes such that the multiple windows occupy an entire area of the touchscreen when the multiple windows are arranged on the touchscreen, and
    display a floating window movable over the entire area of the touchscreen upon reception of a predetermined touch input such that at least part of the floating window overlaps with at least one of the multiple windows,
    wherein the controller controls a transparency of the floating window such that the multiple windows are available to be displayed through the floating window, and
    wherein the size and transparency of the floating window is adaptively changed according to a type of an application displayed on a window to which the floating window is moved.

2. The electronic device of claim 1, wherein at least one of the different applications includes at least one of a messenger application and a notepad application.

3. The electronic device of claim 2, wherein the messenger application includes at least one of e-mail, instant messenger (IM), short message service (SMS), multimedia messaging service (MMS) and social network service (SNS) messenger applications.

4. The electronic device of claim 2, wherein the predetermined touch input includes touch input applied to a text input field,
    wherein the controller displays a keypad in the form of the floating window on the touchscreen in response to the touch input.

5. The electronic device of claim 4, wherein the controller displays the floating window at a position where a region for displaying input text in the multiple windows is not covered with the floating window.

6. The electronic device of claim 4, wherein the controller adjusts the size of the floating window and displays the floating window such that a region for displaying input text in the multiple windows is not covered with the floating window.

7. The electronic device of claim 4, wherein the controller controls the keypad to be included in one of the multiple windows and displays the window including the keypad in the entire area of the touchscreen upon reception of predetermined touch input applied to the floating window.

8. The electronic device of claim 1, wherein the controller displays, through the floating window, an application executed according to multitasking other than applications executed through the multiple windows.

9. The electronic device of claim 8, wherein, when the controller receives an input for displaying a second floating window on the touchscreen while the multiple windows and a first floating window are displayed on the touchscreen, the controller controls display of the second floating window in consideration of the multiple windows and at least one of the position, size and transparency of the first floating window.

10. The electronic device of claim 1, wherein, when the controller receives an input for moving the floating window to one side of the touchscreen, the controller hides the floating window by reducing the size of the floating window to display the floating window as a predetermined indicator at one side of the touchscreen.

11. The electronic device of claim 1, wherein, when the controller receives an input for selecting the floating window, the controller displays a bar for controlling the transparency of the floating window on the touchscreen and controls the transparency of the floating window through an input applied to the bar.

12. The electronic device of claim 1, wherein, when the controller receives zoom-in input applied to the floating window while a first multi-window, a second multi-window and the floating window are displayed on the touchscreen, the controller changes the size of the floating window such that the floating window covers at least one of the first multi-window and the second multi-window while changing the transparency of the floating window.

13. The electronic device of claim 1, wherein, when applications executed according to multitasking other than applications executed through the multiple windows are present, the controller displays a button through which the other applications are displayed on one of the multiple windows, on the multiple windows.

14. The electronic device of claim 13, wherein the controller displays the other applications on the corresponding multi-window at a predetermined interval when touch input applied to the button is maintained for a predetermined time.

15. The electronic device of claim 13, wherein the controller displays the execution screen of an application related to at least one of applications respectively executed through the multiple windows on the corresponding multi-window upon reception of touch input applied to the button.

16. The electronic device of claim 1, wherein the controller displays, on the touchscreen, at least one application candidate group displayable on the touchscreen through the floating window.

17. The electronic device of claim 1, wherein the user controls the movement of the floating window on the touchscreen based on the predetermined touch input.

18. A method of controlling an electronic device, comprising:
displaying multiple windows adjacent to each other, respectively displaying execution screens of different applications on a touchscreen, wherein the respective multiple windows have sizes such that the multiple windows occupy an entire area of the touchscreen when the multiple windows are arranged on the touchscreen; and
displaying a floating window movable over the entire area of the touchscreen such that at least part of the floating window and at least one of the multiple windows overlap upon reception of predetermined touch input,
wherein the transparency of the floating window is controlled such that the multiple windows are projected through the floating window, and
wherein the size and transparency of the floating window is adaptively changed according to a type of an application displayed on a window to which the floating window is moved.

19. The method of claim 18, wherein the predetermined touch input includes touch input applied to a text input field,
wherein the displaying of the floating window comprises displaying the floating window at a position where a region for displaying input text in the multiple windows is not covered with the floating window.

20. The method of claim 18, wherein the predetermined touch input includes touch input applied to a text input field,
wherein the displaying of the floating window comprises adjusting the size of the floating window and displaying the floating window such that a region for displaying input text in the multiple windows is not covered with the floating window.

* * * * *